United States Patent [19]

Berggren

[11] 4,323,745
[45] Apr. 6, 1982

[54] METHOD AND APPARATUS FOR EFFECTING BY MICROWAVES A SUBSTANTIALLY UNIFORM HEATING OF A MATERIAL IN A CAVITY

[75] Inventor: Benny Berggren, Vällingby, Sweden

[73] Assignee: Stiftelsen Institutet for Mikrovagsteknik vid Tekniska Hogskolan i Stockholm, Stockholm, Sweden

[21] Appl. No.: 107,258

[22] Filed: Dec. 26, 1979

Related U.S. Application Data

[63] Continuation of Ser. No. 892,014, Mar. 31, 1978, abandoned.

[30] Foreign Application Priority Data

Apr. 7, 1977 [SE] Sweden ................................ 7704137

[51] Int. Cl.³ .............................................. H05B 6/74
[52] U.S. Cl. ...................... 219/10.55 A; 219/10.55 F; 219/10.55 M; 264/26
[58] Field of Search ................ 219/10.55 A, 10.55 F, 219/10.55 R, 10.55 M, 10.55 E; 264/25, 26, 27; 333/227, 228, 230

[56] References Cited

U.S. PATENT DOCUMENTS

| | | | |
|---|---|---|---|
| 2,593,067 | 4/1952 | Spencer | 219/10.55 E |
| 2,790,054 | 4/1957 | Haagensen | 219/10.55 F |
| 3,307,010 | 2/1967 | Püschner | 219/10.55 R |
| 3,376,524 | 4/1968 | Wang | 333/83 R |
| 3,420,923 | 1/1969 | Ashworth et al. | 219/10.55 M |
| 3,469,053 | 9/1969 | Levinson | 219/10.55 E |
| 3,494,724 | 2/1970 | Gray | 219/10.55 R |
| 3,511,899 | 5/1970 | Miller et al. | 264/26 |
| 3,806,689 | 4/1974 | Kegerels et al. | 219/10.55 F |
| 3,851,131 | 11/1974 | Johnston et al. | 333/83 R |
| 3,974,355 | 8/1976 | Bach | 219/10.55 A X |
| 4,004,122 | 1/1977 | Hallier | 219/10.55 A |

Primary Examiner—B. A. Reynolds
Assistant Examiner—Philip H. Leung
Attorney, Agent, or Firm—LeBlanc, Nolan, Shur & Nies

[57] ABSTRACT

A method and an apparatus for accomplishing substantially uniform heating of a dielectric material, e.g., an injection molded plastic, attached to, i.e., filling and engaging the walls of a metal encased cavity using microwave energy supplied simultaneously into the cavity at two different frequencies so that two resonance modes arise within the cavity, the two frequencies being so chosen to differ slightly and so that the resonance modes which arise have no coinciding zero points within the cavity. The apparatus has microwave sources connected by waveguides or coaxial conductors into different locations in the cavity. By avoiding coincidence of zero points of the resonance mode an even uniform heating of the material in the cavity is accomplished.

4 Claims, 5 Drawing Figures

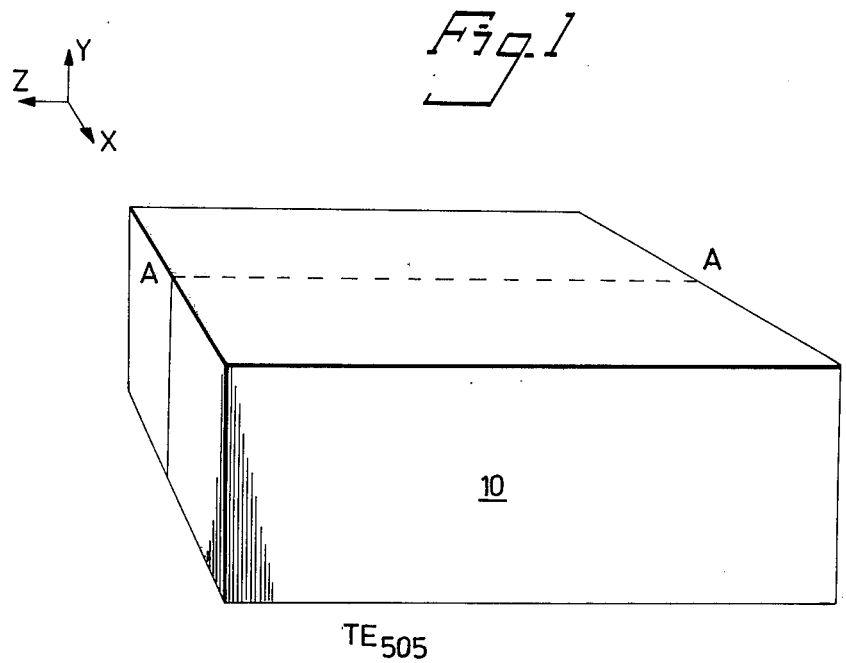
Fig. 1
$TE_{505}$
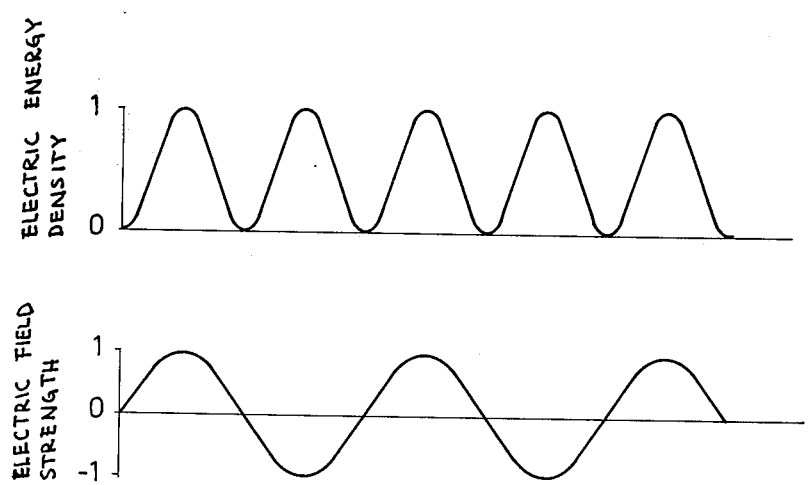

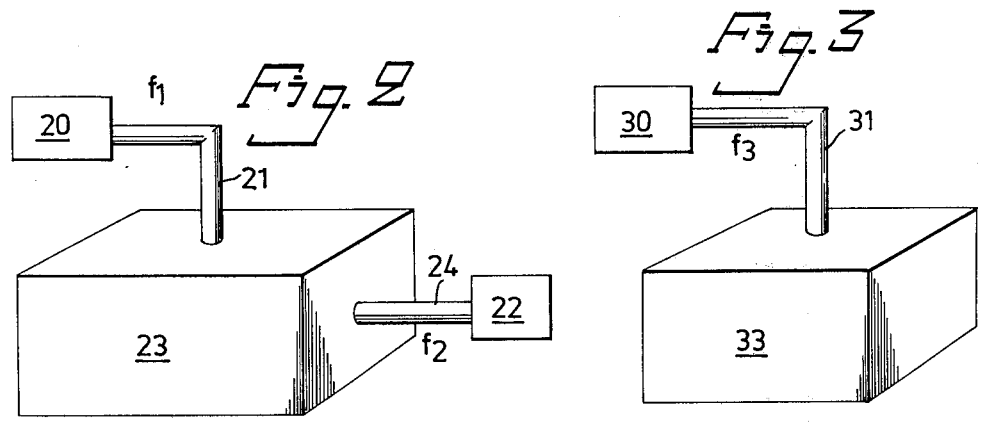
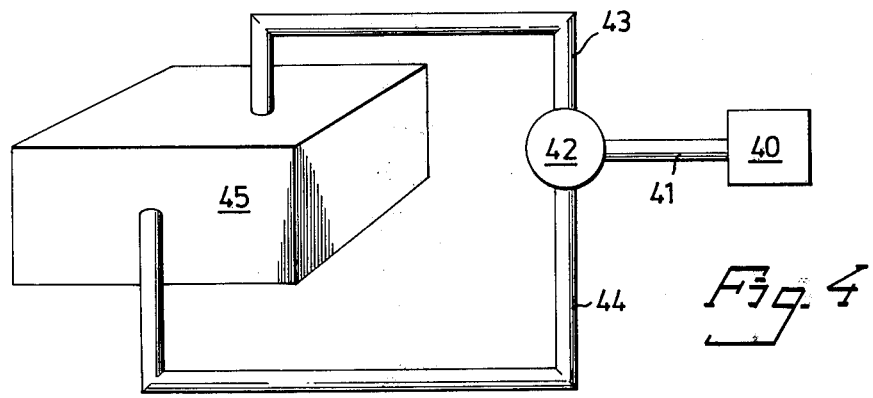
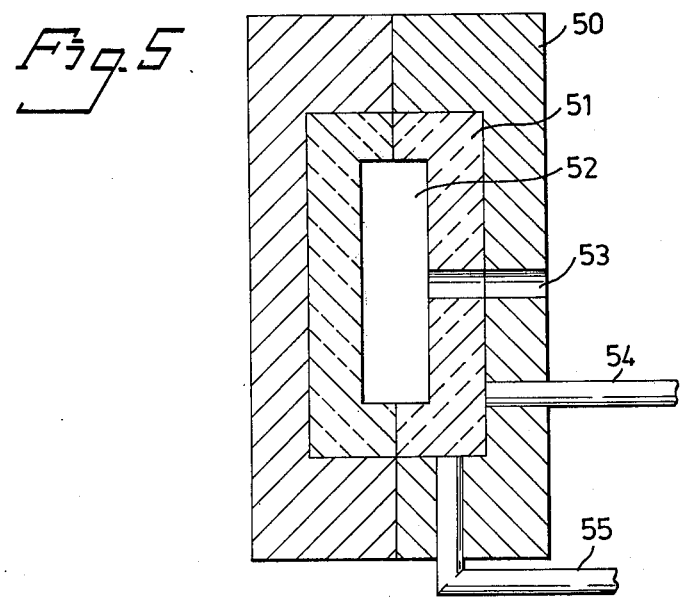

METHOD AND APPARATUS FOR EFFECTING BY MICROWAVES A SUBSTANTIALLY UNIFORM HEATING OF A MATERIAL IN A CAVITY

CROSS-REFERENCE TO RELATED APPLICATION

This application is a continuation of application Ser. No. 892,014 filed Mar. 31, 1978 now abandoned.

BACKGROUND OF THE INVENTION

The present invention relates to a method and an apparatus for effecting by means of microwaves a substantially uniform heating of a material attached in a cavity. The invention is intended to be used especially at the heating of plastic material of both thermosetting resin and thermoplastic resin type.

Heating by microwaves is known since a long time ago. It was not clearly known, however, how a material attached in a cavity could be heated uniformly, i.e. how a uniform distribution of energy in the cavity could be obtained.

The present invention provides a method and an apparatus for effecting a substantially uniform energy distribution in a cavity when the dielectric losses of the material attached in the cavity are not too great. Examples of such dielectric materials, for which the invention can be utilized, are plastics, glass, paper, wood, most of the ceramic materials and many rubber types. The invention can be applied also to other dielectric materials with dielectric properties similar to those in the example. At the injection moulding of thermoplastic resin, liquid plastic of a relatively high temperature is injected into a relatively cold mould. During the injection operation the plastic is cooled, and thereby its viscosity increases substantially. As a result thereof, the mould at times is not filled entirely, or the temperature of the plastic being injected is increased, thereby deteriorating the quality. For filling the mould entirely, the injection pressure must be increased, which gives rise to internal stresses in the detail. A further disadvantage is that the mould must be dimensioned for a higher pressure. It is, therefore, desired to supply heat during the injection operation and thereafter to rapidly cool the details. This has been rendered possible by the present invention.

At the injection moulding of thermosetting resin, today the low production capacity is one of the most serious reasons restricting a wider use of this technique. By microwave heating, the setting times can be reduced substantially.

There exist various possibilities according to the present invention to bring about a uniform heating, i.e. an electic field energy density in the cavity which is as uniform as possible. For a better understanding of the invention, its method and apparatus are described in the following. The characterizing features of the invention become apparent from the attached claims.

In order to facilitate the understanding of the description of the invention, the invention is illustrated in the accompanying drawings, FIG. 1 shows a cavity and the variation of the electric energy density and field strength in the cavity.

FIG. 2 shows an embodiment of the invention.

FIG. 3 shows another embodiment of the invention.

FIG. 4 shows a further embodiment.

FIG. 5 shows the invention applied to the injection moulding of plastic.

For elucidating the invention, at first a basic relation with respect to the conditions in a metal cavity is to be stated.

At microwave heating of a certain material, the heat effect per unit of volume is proportional to the frequency, to certain material properties and the density of the field energy in the material according to the following formula:

$$P_v = \pi \cdot f \cdot \epsilon \epsilon_o \tan \delta (E)^2$$

where
 $P_v$ = heat effect per unit of volume
 $\pi$ and $\epsilon_o$ constants
 f = frequency
 $\epsilon$, tan $\delta$ dielectric material constants
 E = electric field strength When heating a material in a metal cavity, microwave energy can be supplied only at certain frequencies, viz. the resonance frequencies of the cavity. The cavity acts as a resonator with a variety of different resonance modes. In each resonance mode the distribution of the electric energy density is such, that it is zero in certain points and maximum in other points. The heating consequently is non-uniform. For illustrating this, FIG. 1 shows in its upper part the outer contour of a cavity 10 of a rectangular parallelepipedic shape, and in its lower part the variation of the electric density and electric fieldstrength in the section A-A when the cavity operates in the $TE_{505}$-mode.

The heat development, as seen, is non-uniform, because the density of the electric field energy is certain points drops to zero. This is a fact desired to be avoided.

According to the present invention, the said non-uniform heating is avoided to a great extent thereby, that the heating is carried out by means of microwave energy in two or more modes heating independently of each other.

An apparatus for carrying out such a method is shown in FIG. 2. A first microwave generator is designated by 20 and a second microwave generator is designated by 22. The generators are not locked to each other, but operate with a microwave frequency $f_1$ for the generator 20 and a microwave frequency $f_2$ for the generator 22. A cavity 23 is fed via waveguide or coaxial line 21 and, respectively, 22 from the generator 20 and, respectively, 22. The prevailing operation conditions are chosen so, that two resonance modes occur in the cavity 23, resulting in the total of the electric field energies having a distribution, which is different from zero everywhere within the cavity. It possibly can be permitted that zero points occur immediately adjacent the metal wall enclosing the cavity. The two frequencies $f_1$ and $f_2$ are slightly different from each other.

Another embodiment of an apparatus according to the invention is shown in FIG. 3 where the cavity is designated by 33, a generator for microwave energy by 30 and a waveguide or coaxial conductor by 31. The generator 30 produces a microwave frequency $f_3$, which is variable, for example, thereby that the generator 30 is designed as a voltage tuned magnetron. The cavity 33 is fed via the waveguide or coaxial conductor 31. During a heating operation of the material in the cavity, the generator 30 is caused to operate with different frequencies, so that different modes are formed in the cavity 33. It may be difficult to excite several modes by means of the apparatus shown in FIG. 3 and, therefore, according to a further development of the invention, the apparatus can be so modified that the correct mode is excited.

Such a modified embodiment of the invention is shown in FIG. 4. It comprises a generator 40, which as in the foregoing case may be a voltage tuned magnetron, but also may consist of another tunable microwave generator. The generator 40 is connected via a waveguide or coaxial conductor 41 to a coaxial or waveguide switch 42, which via a first waveguide or coaxial conductor 43 and a second waveguide or coaxial conductor 44 is connected to the cavity 45. The apparatus is so constructed, that for the frequency produced in the case in question by the generator 40 the switch 42 is shifted so that via the respective waveguide or coaxial conductor 43 or 44 energy is coupled to the cavity 45 in such a manner (by coupling the waveguide or coaxial conductor to different places in the cavity), that for each of the frequencies used and produced by the generator a correct mode is excited.

The apparatus shown in FIG. 4 can be used also in an alternative way, at which the generator 40 is designed to produce a fixed frequency. The switch 42 in this case is used for coupling the microwave energy produced by the generator 40 via the two separate waveguides or coaxial conductors 43 and, respectively, 44 to the cavity 45, so that two different resonance modes can be obtained with the same resonance frequency.

At the embodiments of the invention shown in FIGS. 2-4, two resonance modes have been used at the heating of a material, and according to FIGS. 2 and 4 two different couplings to the cavity have been used. It is, however, possible to use more than said two resonance modes, and also the supply of the energy to the cavity can be effected by more than two couplings. It is, thus, apparent that the invention is not restricted to heating with only two modes, but a greater number of modes can be used. For reasons of simplicity, in the drawings the cavities are shown as rectangular parallelepipeds, but also cylindric, spherical or cavities of some other form can be used.

The teaching of the present invention, as already mentioned, renders it possible to substantially improve the uniformity of heating. An equipment can be designed, thus, which provides a substantially uniform heating in the cavity, except for the zone adjacent the metal wall, which encloses the cavity. In a rectangular parallelepipedic cavity with square cross-section the heating can take place in the resonance modes $TE_{701}$, $TE_{107}$ and $TE_{505}$.

As already pointed out in the introductory portion above, it was tried to find possibilities of supplying heat into a mould used for moulding plastic material. The invention described above has proved very suitable for use in injection moulding of thermosets. An apparatus for this purpose is shown in FIG. 5. In a normal metal mould a cavity in the form of a rectangular parallelepiped has been formed. Into said cavity a ceramic mould has been fitted, of which the ceramic material must show relatively small dielectric losses and, therefore, may consist of aluminium oxide, for example. The ceramic mould, thus, is an insert in said cavity. In said ceramic mould a cavity is provided, in which the thermosetting resin is moulded. The metal cavity here acts as a resonator. The ceramic found in the cavity changes the wave length, but due to the small losses almost all of the heat is developed in the thermoset found in the central portions of the cavity. When molten plastic mass has been injected into the ceramic mould, and the mould is filled with said plastic mass, microwave energy is supplied, and the plastic cures very rapidly.

FIG. 5 is a sectional view through a metal mould 50, in which said cavity in the form of a rectangular parallelepiped is formed which in FIG. 5 is shown filled by a mould 51 of ceramic material. Within said ceramic mould 51 a cavity 52 is formed which here is shown having the form of a rectangular parallelepiped, but of course in practice has the form, which the plastic detail after completed setting is intended to have. The molten plastic material is supplied to the mould cavity 52 via a passageway 53 by utilizing means and methods, which are well-known in this technical field and need not be described here.

The cavity in the metal mould 50 filled with the ceramic mould 51 is supplied with microwave energy via the two coaxial conductors or waveguides 54 and 55, so that different resonance modes in the cavity are obtained.

The apparatus shown schematically in FIG. 5 has the substantial advantage of its adjustability to injection moulding of different forms of objects by exchanging the ceramic mould 51 provided with the mould cavity 52. As it is possible by a suitable supply to obtain a relatively uniform microwave energy density in that portion of the cavity where the mould cavity 52 for the plastic is located, a change of the form of the object has only a small effect on the heating operation. The greatest part of the cavity volume is occupied by the ceramic mould 51, which thus, together with the geometric conditions of the cavity, substantially determines the field distribution.

The invention, of course, is not restricted to the method and the apparatuses, which in detail have been described above. It is obvious to the expert that alterations and modifications can be made within the scope of the claims without abandoning the idea of the invention.

I claim:

1. A microwave apparatus for substantially uniformly heating a dielectric material wherein microwave energy is supplied into a cavity in a manner causing at least two resonant modes to arise in the cavity, comprising: a metal enclosure, an insert made from a material, such as a ceramic material, with a low loss factor, said insert is contiguously enclosed by said metal enclosure, wherein the contacting surfaces of said insert conforms the shape of the inside surfaces of said enclosure, said insert further defines a cavity therein, a dielectric material to be heated which has a relatively high loss factor than said ceramic material, is attached to the surfaces within and substantially completely fills said cavity, means connecting at least two microwave energy sources to said cavity including means to effect simultaneous exciting of said cavity in at least two resonant modes, having different frequencies, which frequencies differ only slightly so that said at least two resonant modes arise and none of the zero points of the distribution of the electric energy density of said resonant modes conincides with any other zero points within said cavity.

2. An apparatus according to claim 1, wherein said means connecting the cavity to said at least two microwave energy sources are independent waveguides from associated said microwave energy sources and connected to and opening at different locations into said enclosure.

3. An apparatus according to claim 1, wherein said means connecting the cavity to said at least two microwave sources are coaxial conductors from associated said microwave energy sources and connected to and opening at different locations into said enclosure.

4. A method of effecting by microwave energy a substantially uniform heating of a dielectric material which has a relatively high loss factor, is attached to the surfaces within and substantially completely fills a cavity formed inside an insert which is made from a material with a low loss factor, such as a ceramic material, said insert is continuously enclosed by a metal enclosure, wherein microwave energy is supplied by two microwave energy sources into said cavity in a manner causing at least two resonant modes to arise in said cavity, said cavity being supplied simultaneously with microwave energy with at least two different frequencies, which differ only slightly, and said resonant modes being so chosen that none of the zero points of the distribution of the electric energy density of said modes within the cavity coincides with any other zero points.

* * * * *